United States Patent [19]

Kwiatkowski

[11] Patent Number: 5,487,497
[45] Date of Patent: Jan. 30, 1996

[54] BICYCLE HANDLE BAR ACCESSORY MOUNT

[76] Inventor: Frank P. Kwiatkowski, 311 N. Drake Ave., Fullerton, Calif. 92632

[21] Appl. No.: 342,894

[22] Filed: Nov. 21, 1994

[51] Int. Cl.⁶ .................................................. B62J 7/06
[52] U.S. Cl. .............................. 224/41; 224/39; 224/30 A
[58] Field of Search ........................... 224/30 R, 32 R, 224/33 R, 33 A, 36, 39, 41, 30 A; 280/288.4, 304.5; 269/87.1, 87.2 X, 87.3

[56] References Cited

U.S. PATENT DOCUMENTS

| | | | |
|---|---|---|---|
| 3,598,295 | 11/1969 | Seegers | 224/41 |
| 3,866,897 | 2/1975 | Whalen, Jr. | 269/87.2 |
| 3,948,424 | 4/1976 | Hunn et al. | 224/41 |
| 4,250,770 | 2/1981 | Robertson, Jr. | 224/41 |
| 4,436,350 | 3/1984 | Jolin | 224/41 |
| 4,798,318 | 1/1989 | Irwin . | |
| 4,800,664 | 1/1989 | Marstall | 224/30 A |
| 4,974,759 | 12/1990 | McDonough | 224/39 |
| 5,040,710 | 8/1991 | Lee | 224/36 |
| 5,197,640 | 3/1993 | Hurley et al. | 224/30 A |

Primary Examiner—Henry J. Recla
Assistant Examiner—Gregory M. Vidovich
Attorney, Agent, or Firm—Edward E. Roberts

[57] ABSTRACT

A bicycle handle bar accessory mounting assembly including a primary accessory support bar, first and second slotted suspension bars, and first and second bicycle handlebar clamp devices. The clamp devices are attached adjacent the handle grips, with first ends of the suspension bars attached thereto. The support bar has a main body portion for mounting of accessories, with the opposite ends thereof slotted for adjustable attachment to the slots of the suspension bars. Rear view mirrors may be attached through the slots of the support bar. The main body portion is provided with an adjustable clamping mechanism for enabling attachment and removal of an accessory, such as a radio, or the like. Hook and eye fasteners are attached to the support bar for mounting of other devices, such as speakers.

18 Claims, 4 Drawing Sheets

5,487,497

BICYCLE HANDLE BAR ACCESSORY MOUNT

BACKGROUND OF THE INVENTION

1. Field of the Invention

This invention relates to bicycle and or motorcycle accessory apparatus, and more particularly to an apparatus for mounting accessory devices to the handle bar of a bicycle or motorcycle.

2. Description of the Prior Art

Bicycling and motorcycling are both popular pastimes. During the activity, cyclers often have a need for carrying various objects. In some instances, carriers have been developed for placement over the front or rear wheels, with such carriers having braces attachable to the front or rear axles, respectively. Other such devices include baskets formed of wire for attachment to the front handlebars in a manner in which the basket extends over the front wheel. Likewise, rear saddlebags have been developed.

On many bicycles and or motorcycles, the cyclist may have one or more rear view mirrors attached to the handlebars, just forward of the handle grips. In addition, a cyclist may have a horn or light attached to the handlebars by suitable clamps. In recent times, cyclists like to carry additional items, such as music-playing devices, such as radios, tape players, CD players and the like. In many instances such devices come with detached speakers, usually a pair of such speakers.

In accordance with a feature of the present invention, there is provided a new and improved handle accessory mounting assembly for bicycles and or motorcycles.

SUMMARY OF THE INVENTION

The foregoing and other objects of the invention are accomplished by providing a handle bar accessory mounting assembly including a primary accessory support bar, first and second slotted suspension bars, and first and second bicycle/motorcycle handlebar clamp devices. The clamp devices are attached adjacent the handle grips, with first ends of the suspension bars attached thereto. The support bar has a main body portion for mounting of accessories, with the opposite ends thereof slotted for adjustable attachment to the slots of the suspension bars. Rear view mirrors may be attached through the slots of the support bar. The main body portion is provided with an adjustable clamping mechanism for enabling attachment and removal of an accessory, such as a radio, or the like. Hook and eye fasteners are attached to the support bar for mounting of other devices, such as speakers.

Other objects, features and advantages of the invention will become apparent on a reading of the specification when taken in conjunction with the drawings in which like reference numerals refer to like elements in the several views.

DESCRIPTION OF THE PREFERRED EMBODIMENT

Figure 1:
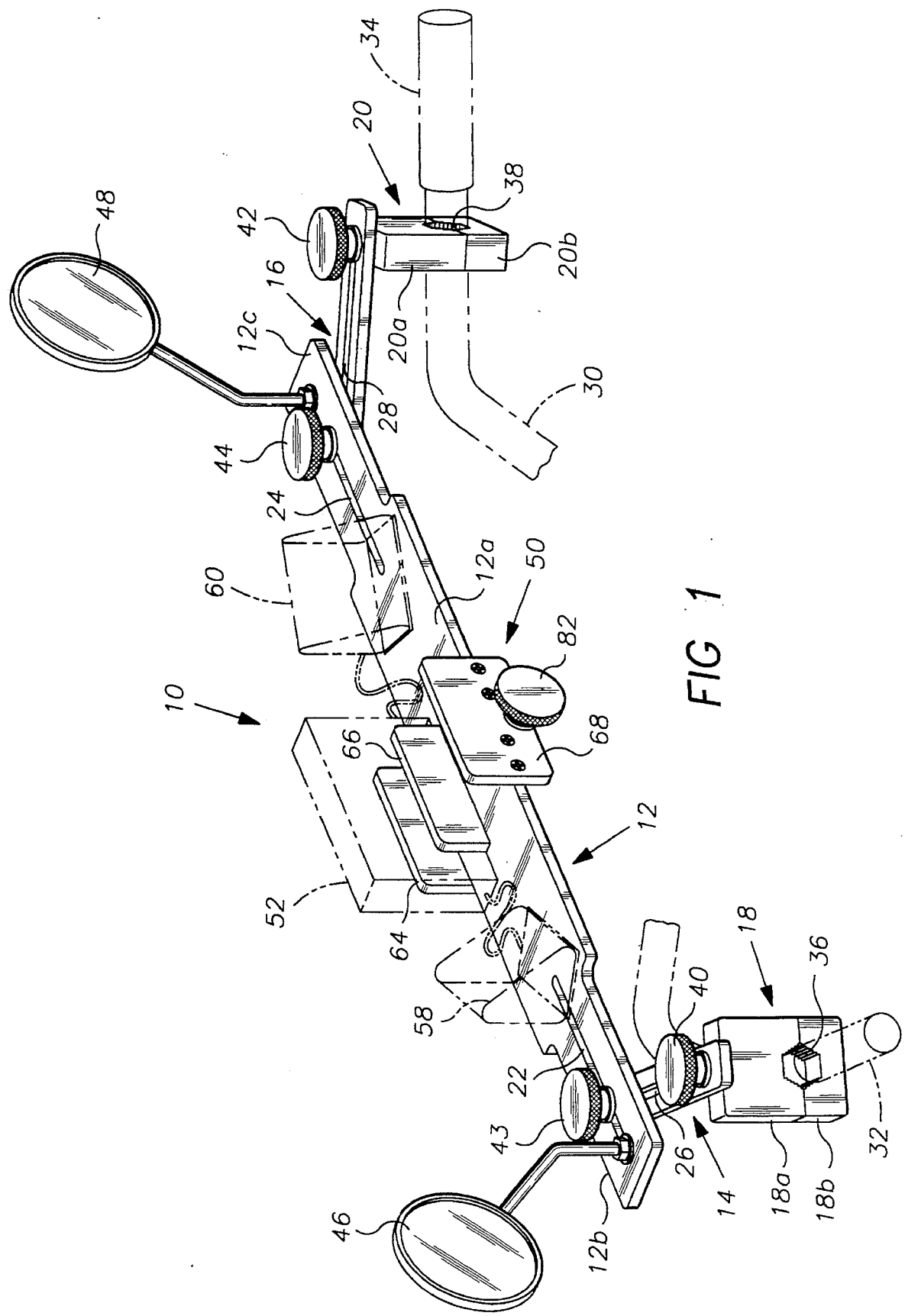
FIG. 1 is a perspective view of a bicycle handle bar accessory mounting assembly in accordance with the invention.
Figure 2:
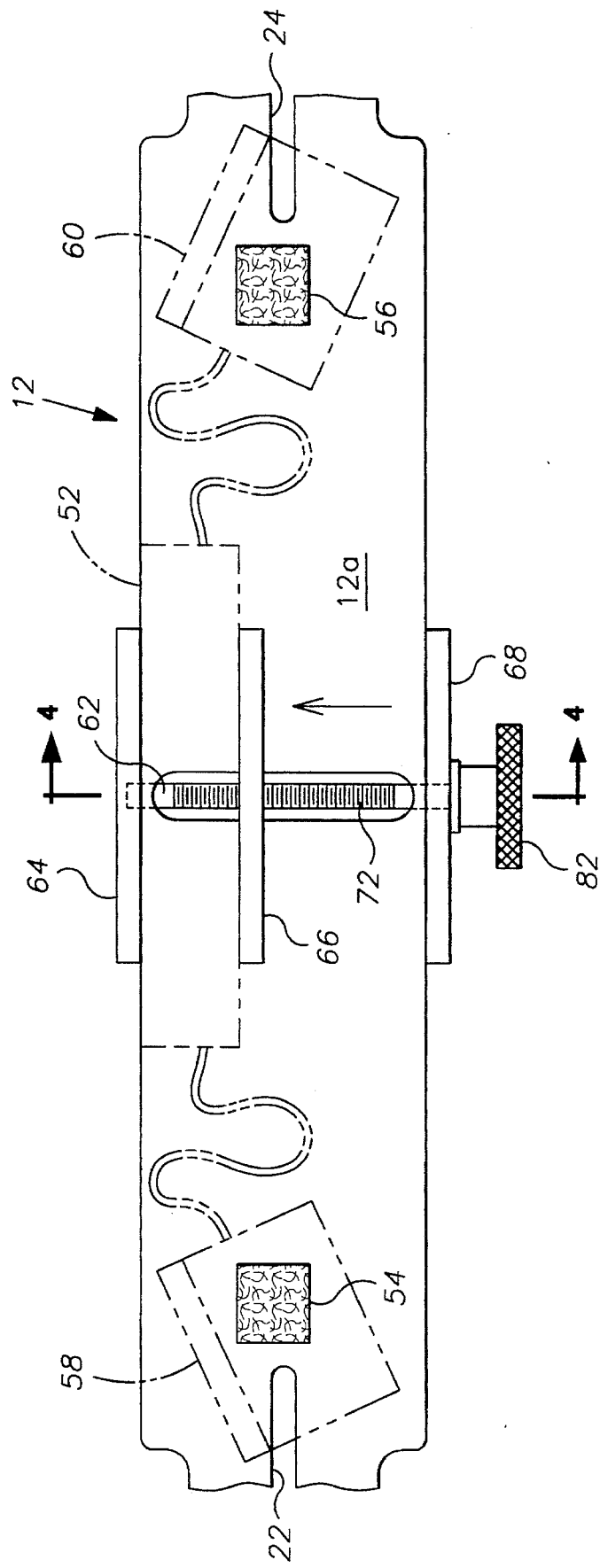
FIG. 2 is a top plan view of the primary accessory support bar, particularly broken away, showing the accessory clamping mechanism.
Figure 3:
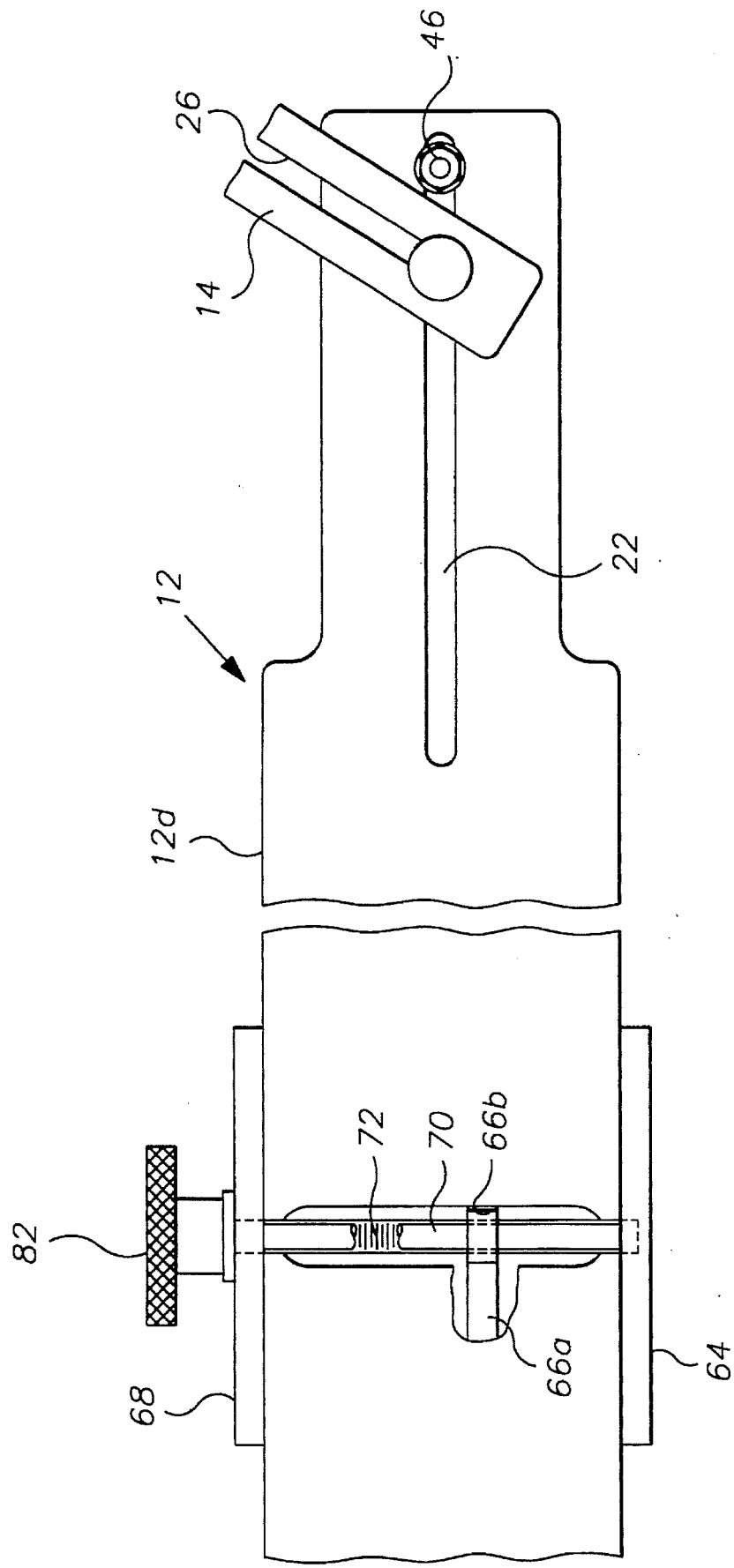
FIG. 3 is a fragmentary top plan view of a portion of the accessory support bar, showing the attachment of a suspension bar at one end thereof.

Referring now to the drawings and particularly to FIGS. 1 through 3, there is shown a handle bar accessory mounting assembly for a bicycle or motorcycle, generally designated 10, which includes a primary accessory support bar, generally designated 12, first and second slotted suspension bars, 14 and 16, and first and second handlebar clamp devices, 18 and 20. The parts are formed of a rigid material, such as aluminum, or a non-rusting metal alloy, although plastic of suitable thickness and rigidity may be conveniently employed. The component parts of the assembly 10 are configured and dimensioned for attachment to the handle bar 30 (shown in broken lines) of a cycle such as a bicycle, motorcycle, or the like, with the clamp devices 18 and 20 being attached adjacent the handle grips 32, 34 of the handle bar 30.

The support bar 12 is formed as a generally elongate generally rigid bar shaped member of generally uniform thickness, with the central, or main body portion 12a, having a width greater than the out ends 12b and 12c. The main body portion 12a provides a generally planner platform-like surface for accessories, as will be described. The ends 12b and 12c are provided with elongate slots 22,24, which are in alignment on the longitudinal or axial centerline of the support bar 12.

The suspension bars 14, 16 are shorted bar,shaped members, each having a slot 26, 28, respectively, formed therein. The clamp devices 18, 20 are each formed of two pieces 18a, 18b and 20a, 20b, of block material, with generally U shaped cut-outs formed in mating edges thereof to form an opening 36, 38 slightly smaller than the diameter of the handle bar 30, the two pieces being attached to the handle bar 30 by fasteners, such as machine screws (not shown), passing through a pair of apertures in the lower block for engagement with aligned threaded openings in the upper block of the clamps 18, 20. The upper edges of the blocks 18a, 20a are each provided with a threaded aperture for matingly receiving the threaded shaft of a knurled enlarged head fastener 40, 42, respectively.

The clamping devices 18, 20, are attached to the handle bar 30 adjacent the handle grips 32, 34. First ends of the suspension bars 14, 16, are attached to the clamping devices 18, 20, respectively, forwardly of the handle bar 30, by passage of the shaft of the fastener 40, 42, respectively, therethrough, into engagement with the threaded apertures of the blocks 18a, 20a, respectively, whereupon, the fasteners 40, 42, are hand tightened to a desired angle of the suspension bars 14, 16, relative to the handle bar 30.

The support bar 12 is then attached by means of knurled enlarged head fasteners 43, 44, with the threaded shafts thereof passing through the slots 22, 24, of support bar 12, and then through slots 26, 28, respectively, with wing nut members (not shown) threaded to the shafts at the underside of the assembly 10. The parts are adjusted prior to final securing of the fasteners so that the primary support 12 is generally parallel to the neck portion of the handle bar 30, and positioned generally centrally with respect to the width of the handle bar 30.

Furthermore, the suspension bars 14, 16, with the elongate slot therein, enable adjustable positioning of the spacing of the support bar 12 forwardly (or rearwardly) of the handle bar 30. Rear view mirrors 46, 48, may be attached through the slots 22, 24, of the support bar 12 at the distal ends thereof.

Figure 4:
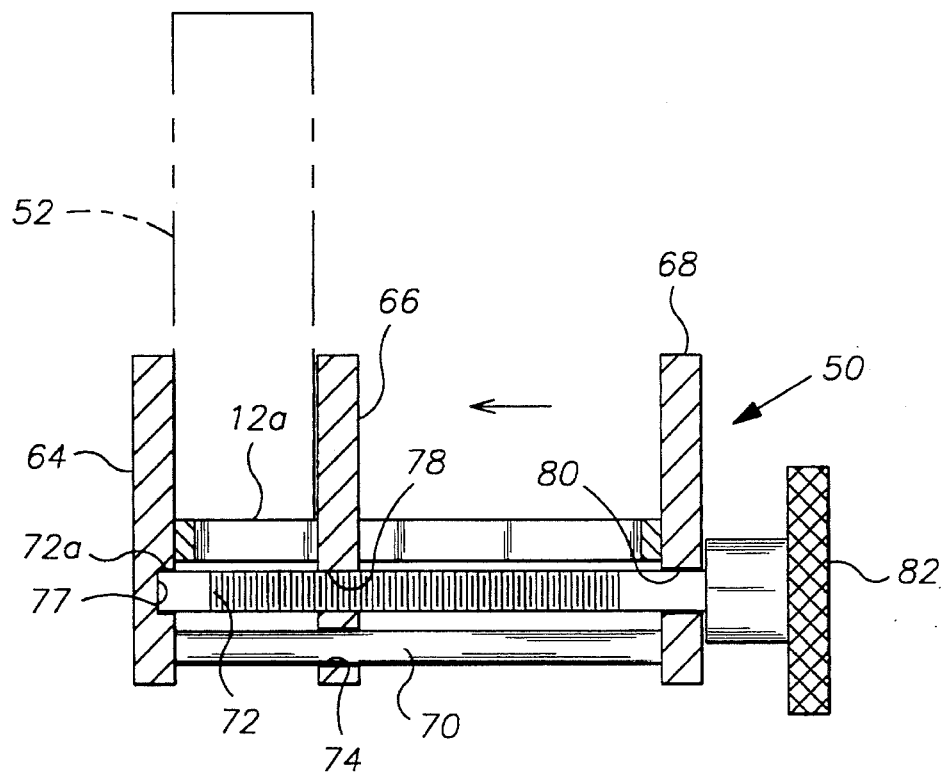
FIG. 4 is a partially cross-sectioned side elevational view of the accessory clamping mechanism taken generally along line 4—4 of FIG. 2.
Figure 5:
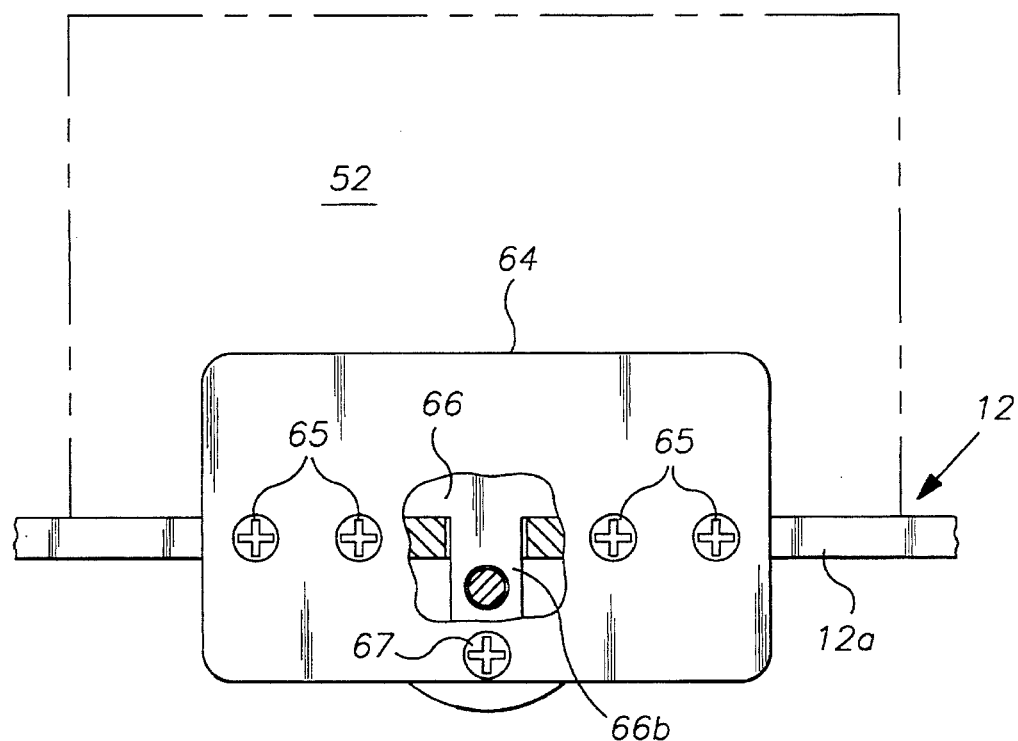
FIG. 5 is a rear view of the clamping mechanism of FIG. 4, partially broken away, to reveal internal details.

Referring also to FIGS. 4 and 5, the support bar 12 has attached thereto, at the approximate midpoint of the main body portion 12a, an accessory adjustable clamping mechanism, generally designated 50, which is constructed much like a vise. The adjustable clamping mechanism 50 is configured for enabling attachment and removal of an accessory, such as a radio 52 (shown in dotted lines in FIG. 1), or the like. Hook and eye fasteners, such as Velcro patches 54, 56 (See FIG. 2) are adhesively attached to the main body portion 12a of the support bar 12 for mounting other accessory devices, such as speakers 58,60 (shown in broken lines in FIGS. 1 and 2) thereto.

The clamping mechanism 50 is constructed as will now be explained. By reference to FIG. 2, the main body portion 12a of support bar 12 is provided with a guide slot 62 extending laterally, that is, perpendicular to the longitudinal centerline of the support bar 12, the guide slot 62 spanning most of the width thereof. First and second jaws 64, 66 (See FIG. 4) are provided, the jaws 64, 66 being formed from generally planar metallic plate stock of a generally rectangular area dimension. The first jaw 64 is fixedly secured with suitable fasteners, such as screws 65 (See FIG. 5), to one longitudinal edge of the support bar 12 centrally positioned with respect to the midpoint thereof and, as shown, has a portion depending below the lower surface of the support bar 12.

The other movable jaw 66 is of the same general dimensions, except that the lower edge 66a thereof is a straight edge configured for sliding, generally abutting relation with the upper surface of the support bar 12. The jaw 66 is provided with an integrally formed guide tongue portion 66b (See FIG. 5), having a width slightly less than the width of the guide slot 62.

A stop plate 68 is formed of the same general dimensions and configuration of the first jaw 64 and secured with suitable fasteners, such as screws, to the edge of the support bar 12, opposite to, and in alignment with, the jaw 64. Both jaw 64 and stop plate 68 are generally planar and lie in planes perpendicular to the plane of the support bar 12 and have portions thereof depending below the lower surface of the support bar 12.

By reference specifically to FIG. 4, below the surface of the support bar, there are two parts, these being a guide rod 70 and a threaded shaft 72. The guide rod 70 is fixedly secured in alignment with the axial centerline of the slot 62, at one end to the fixed jaw 64 and, at the other end to the stop plate 68, such as with screws 67 (FIG. 5), with the rod 70 lying along a line generally parallel to the lower surface of the support bar 12. The formed guide tongue portion 66b of jaw 66 is provided with a first aperture 74 therethrough in the direction of the thickness thereof, the aperture 74 being matingly configured to the rod 70 and slightly larger for passage therethrough of the rod 70 in sliding relation therewith.

The rod 70 provides stabilization to movement of the movable jaw 66. The actuator for the clamping mechanism 50 is the threaded shaft 72, which has one end 72a rotatably and captively retained within a cup-shaped recess 77 formed in the depending inner surface of the fixed law 64.

Apertures 74 and 78 are formed in the guide tongue portion 66b of jaw 66 and the stop plate 68, respectively, these apertures being in alignment with the cup-shaped recess 77, with the axis of shaft 72 lying along a line intermediate rod 70 and the lower surface of support bar 12 and parallel thereto. The shaft 72 is of a length longer than the guide rod 70 for extension through aperture 80 of stop plate 68 and has affixed thereto, or formed integrally therewith, an enlarged head Knurled knob 82 for manual rotation. To enable movement of the movable haw 66, the aperture 78 in the guide tongue portion 66b of jaw 66 is threaded for threadably receiving the shaft 72 therethrough. The aperture 80 is not threaded and of a dimension slightly greater than the cross-sectional dimension of the shaft 72.

As best illustrated in FIG. 1, the clamping mechanism 50 may be readily used for firm attachment of an accessory device, such as radio 52, with Velcro fasteners 54 and 56 used to secure the speakers 58 and 60 to the upper surface of the support bar 12. Adjustable elements may be readily manipulated by virtue of the enlarged head fasteners and knob. The overall construction is sturdy and provides a stable support for such accessories.

Although the description has referred to parts as being separate pieces, it is to be understood, for example, that the fixed jaw 64 and stop plate 68 may be formed integrally by suitable shaping and bending of the material from which the support bar 12 is made. Furthermore, although slots have been depicted in the ends of the support bar 12 and in the suspension bars 14, 16, other adjustment means may be employed, such as a series of apertures. Similarly, other convenient means may be used for attachment of devices such as the speakers, and additionally, other holding devices such as spring clips or the like may be added for holding other accessories, such as a glass case or the like.

In accordance with the present invention there has been shown and described a bicycle/motorcycle, or the like, handle bar accessory mounting assembly that is of relatively inexpensive, uncomplicated construction, which may be readily fabricated from generally available stock utilizing a minimum of machining or other complicated fabrication techniques. Although there has been shown and described a preferred embodiment, it is to be understood that other modifications may be made within the spirit and scope of the invention.

What is claimed is:

1. A handle bar accessory mounting assembly for a vehicle having a handle bar, said assembly comprising:

an elongate generally rigid generally bar-shaped support member having a generally planar upper surface;

an adjustable clamping mechanism on said support member, said mechanism including a fixed member and a movable member for enabling retention of an accessory therebetween on said upper surface;

first and second suspension members;

means on first ends of said suspension members and the distal ends of said support member for adjustably attaching said distal ends of said support member to said first ends of said suspension members, respectively;

means coacting with each of the other ends of said suspension members for mounting said assembly to the handle bar of said vehicle;

said main body portion includes a slot transverse to the longitudinal axis of said support member and said fixed member is a plate attached to a longitudinal edge of said main body portion in perpendicular relation to said transverse slot;

said movable member is configured with a guide tongue portion in sliding engagement within said transverse slot; and said clamping mechanism includes a manually operable threaded shaft member in threaded engagement with said guide tongue portion for enabling movement of said movable member in response to actuation of said shaft member.

2. The assembly of claim 1 further including other means on said upper surface for removably attaching other accessories thereto.

3. The assembly of claim 1 wherein said support member is formed of a bar-shaped rigid material of generally uniform thickness with the distal ends of said support member being of a reduced width to thus provide an enlarged main body portion intermediate said distal ends for support of accessories thereon.

4. The assembly of claim 3 wherein said means on said first ends of said suspension members for adjustably attaching said support member to said suspension members are elongate slots formed therein on the centerlines thereof.

5. The assembly of claim 4 wherein each of said coacting means are clamp devices configured for attachment to the handle bar and the other ends of said suspension members through the slots in said suspension members.

6. The assembly of claim 1 wherein said shaft is in alignment with and in generally parallel relation to said transverse slot.

7. The assembly of claim 6 wherein said clamping mechanism further includes a stop plate member attached to a longitudinal edge of said main body portion opposite said fixed member in perpendicular relation to said transverse slot.

8. The assembly of claim 7 wherein said clamping mechanism further include a stationary guide rod fixedly secured between said fixed member and said stop plate member in generally parallel relation with said shaft member, said tongue portion having an aperture for passage of said guide rod therethrough for slidable engagement therewith.

9. The assembly of claim 1 wherein said suspension members are generally bar-shaped with elongate slots formed thereon on the centerlines of said suspension members.

10. The assembly of claim 1 wherein said distal ends include means for mounting mirrors thereto.

11. A handle bar accessory mounting assembly for a vehicle having a handle bar, said assembly comprising:

an elongate generally rigid generally bar-shaped support member having a generally planar upper surface;

an adjustable clamping mechanism on said support member, said mechanism including a fixed member fixed to said support member and a movable member for enabling retention of an accessory therebetween on said upper surface;

first and second suspension members;

means on first ends of said suspension members and the distal ends of said support member for adjustably attaching said distal ends of said support member to said first end of said suspension members, respectively; and means coacting with each of the other ends of said suspension members for mounting said assembly to the handle bar of said vehicle;

said support member formed of a bar-shaped material of generally uniform thickness with the distal ends of said support member being of a reduced width to thus provide an enlarged main body portion intermediate said distal ends for support of accessories thereon; and said means on the distal ends of said support member for adjustably attaching said support member to said suspension members each comprising elongated slots formed therein on the longitudinal centerline of said support member.

12. A handle bar accessory mounting assembly for a vehicle having a handle bar, said assembly comprising:

first and second clamp devices configured for attachment to the handle bar;

an elongate generally bar-shaped support member having a generally planar upper surface with each of the distal ends of said support member providing a body portion having elongated slots therein on the longitudinal centerline thereof for support of accessories within said slots;

an adjustable clamping mechanism on said support member, said mechanism including a fixed member fixed to said support member and a movable member for enabling retention of an accessory therebetween on said upper surface;

first and second suspension members;

means on first ends of said suspension members and the distal ends of said support member for adjustably attaching said first ends of said suspension members to said slots, respectively;

means coacting with each of the other ends of said suspension members for attachment to said clamp devices for mounting said assembly to the handle bar of said vehicle.

13. The assembly of claim 12 wherein said main body portion includes a slot transverse to the longitudinal centerline of said support member and said fixed member is a plate attached to a longitudinal edge of said main body portion in perpendicular relation to said transverse slot, and wherein said movable member is configured with a guide tongue portion in sliding engagement within said transverse slot.

14. A handle bar accessory mounting assembly for the handle bars of a cycle comprising:

first and second clamp devices configured for attachment to the handle bar;

an elongate generally bar-shaped support member having a generally planar upper surface with the distal ends thereof being configured to provide a main body portion for support of accessories thereon and with said main body portion including a slot transverse to the longitudinal centerline of said support member;

an adjustable clamping mechanism on said support member, said mechanism including a fixed member and a movable member for enabling retention of an accessory therebetween on said upper surface;

first and second suspension members;

means on first ends of said suspension members and the distal ends of said support member for adjustably attaching said distal ends of said support member to said first ends of said suspension members, respectively;

means coacting with each of the other ends of said suspension members for attachment to said clamp devices, respectively, for mounting said assembly to the handle bar of said vehicle;

said fixed member is a plate attached to a longitudinal edge of said main body portion in perpendicular relation to said transverse slot, said movable member is configured with a guide tongue portion in sliding engagement within Said transverse slot; and said clamping mechanism further includes a manually operable threaded shaft member in threaded engagement with said guide tongue portion for enabling movement of said movable member in response to actuation of said shaft member.

15. The assembly of claim 14 wherein said shaft is in alignment with and in generally parallel relation to said transverse slot.

16. The assembly of claim 15 wherein said clamping mechanism further includes a stop plate member attached to an edge of said main body portion opposite said fixed member in perpendicular relation to said transverse slot.

17. The assembly of claim 16 wherein said clamping mechanism further include a stationary guide rod fixedly secured between said fixed member and stop plate member in generally parallel relation with said shaft member, said tongue portion having an aperture for passage of said guide rod therethrough for slidable engagement therewith.

18. The assembly of claim 17 wherein said main body portion includes other fastening means for enabling attachment of additional accessory devices.

\* \* \* \* \*